(12) United States Patent
Liu

(10) Patent No.: US 11,492,214 B1
(45) Date of Patent: Nov. 8, 2022

(54) GLOVE COLLECTING DEVICE

(71) Applicant: Po-Shan Liu, Nantou County (TW)

(72) Inventor: Po-Shan Liu, Nantou County (TW)

( * ) Notice: Subject to any disclaimer, the term of this patent is extended or adjusted under 35 U.S.C. 154(b) by 0 days.

(21) Appl. No.: 17/365,152

(22) Filed: Jul. 1, 2021

(51) Int. Cl.
*B65G 51/02* (2006.01)
*B65G 53/20* (2006.01)

(52) U.S. Cl.
CPC .......... *B65G 51/02* (2013.01); *B65G 2201/02* (2013.01)

(58) Field of Classification Search
None
See application file for complete search history.

(56) References Cited

U.S. PATENT DOCUMENTS

| | | | | |
|---|---|---|---|---|
| 4,229,861 A * | 10/1980 | Campo | .................. | B65H 23/00 226/7 |
| 4,730,955 A * | 3/1988 | Lenhart | ................ | B65G 47/681 406/88 |
| 5,009,550 A * | 4/1991 | Hilbish | ................ | B65G 47/682 406/87 |
| 5,634,636 A * | 6/1997 | Jackson | ................ | B65H 5/228 406/87 |
| 6,203,250 B1 * | 3/2001 | Takeuchi | .......... | H01L 21/67784 414/676 |
| 6,494,646 B1 * | 12/2002 | Sala | ..................... | B65G 51/035 406/88 |
| 8,814,477 B2 * | 8/2014 | Yorio | ..................... | B65G 49/08 406/88 |
| 2005/0098016 A1 * | 5/2005 | Benuzzi | ................ | B65G 51/03 83/733 |

\* cited by examiner

*Primary Examiner* — Kavel Singh

(57) ABSTRACT

A glove collecting device includes a guiding member including an internal space, an inlet at one end, and an outlet at the other end, wherein the end adjacent to the inlet of the guiding member is bent inwards such that the end adjacent to the inlet extends from the inlet towards the outlet to form an interlayer and the interlayer includes a plurality of holes; and an adaptor member disposed externally of the outlet and including a hollow connector distal the outlet, and a channel through the connector for communicating with the space of the guiding member.

9 Claims, 10 Drawing Sheets

GLOVE COLLECTING DEVICE

BACKGROUND OF THE INVENTION

1. Field of the Invention

The invention relates to glove collecting devices and more particularly to a glove collecting device capable of accumulating gloves in a guiding member, removing an adaptor member, and activating a reciprocating board to move the gloves into a collection box.

2. Description of Related Art

Conventionally, after gloves have been produced, the number of the gloves is counted manually or by a machine. Next, an employee pushes a predetermined number of the gloves into a collection box.

However, the conventional process is labor intensive with increased labor cost and decreased collection efficiency (i.e., being not optimized). Further, it is not hygienic.

Thus, the need for improvement still exists.

SUMMARY OF THE INVENTION

It is therefore one object of the invention to provide a glove collecting device comprising a guiding member including an internal space, an inlet at one end, and an outlet at the other end, wherein the end adjacent to the inlet of the guiding member is bent inwards such that the end adjacent to the inlet extends from the inlet towards the outlet to form an interlayer and the interlayer includes a plurality of holes; and an adaptor member disposed externally of the outlet and including a hollow connector distal the outlet, and a channel through the connector for communicating with the space of the guiding member.

The invention has the following advantages and benefits in comparison with the conventional art: A blower is connected to the connector. Suction force is generated in the blower when the blower is activated. Thus, gloves are drawn into the guiding member. Next, the adaptor member is removed after the number of the gloves accumulated in the guiding member has reached a predetermined value. Next, a activation device is activated to push the gloves into a collection box. The collection of the gloves is automated, safe, labor saving and efficient. In addition, the interlayer provides additional passage for air to flow. Thus, the suction force is increased, enabling the collection of the gloves to be even more efficient.

The above and other objects, features and advantages of the invention will become apparent from the following detailed description taken with the accompanying drawings.

DETAILED DESCRIPTION OF THE INVENTION

Figure 1:
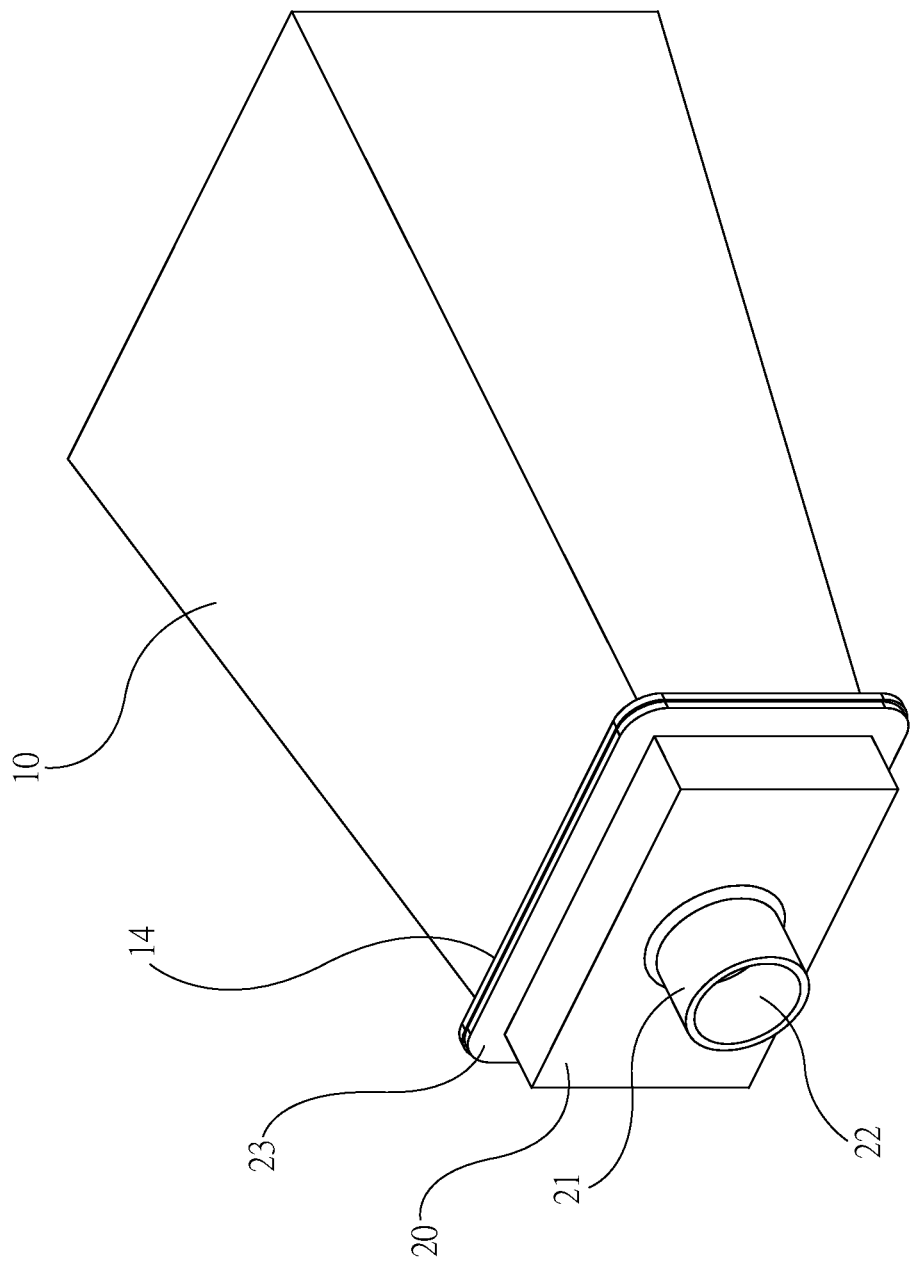
FIG. 1 is a perspective view of a glove collecting device according to a first preferred embodiment of the invention.
Figure 2:
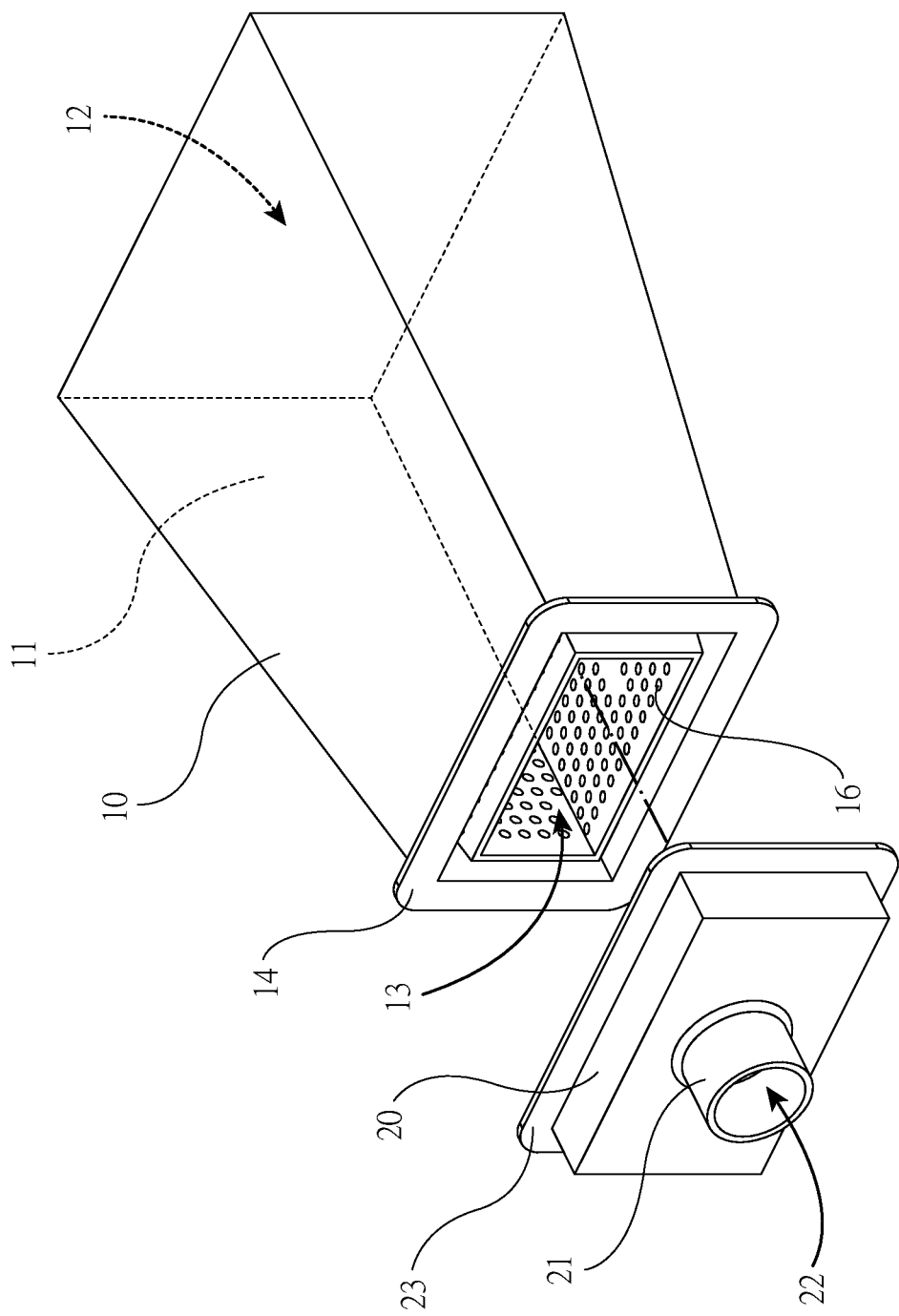
FIG. 2 is an exploded view of FIG. 1.

Referring to FIGS. 1 to 2, a glove collecting device in accordance with a first preferred embodiment of the invention comprises a guiding member 10 and an adaptor member 20 as discussed in detail below.

The guiding member 10 includes an internal space 11, an inlet 12 at one end, and an outlet 13 at the other end. The space 11 is tapered from the inlet 12 to the outlet 13. An outer flange 14 is provided on the outlet 13. The adaptor member 20 is provided externally of the outlet 13 and includes a hollow, cylindrical connector 21 distal the outlet 13, a channel 22 through the connector 21 for communicating with the space 11, and an outer flange 23 proximate the outlet 13.

Figure 3:
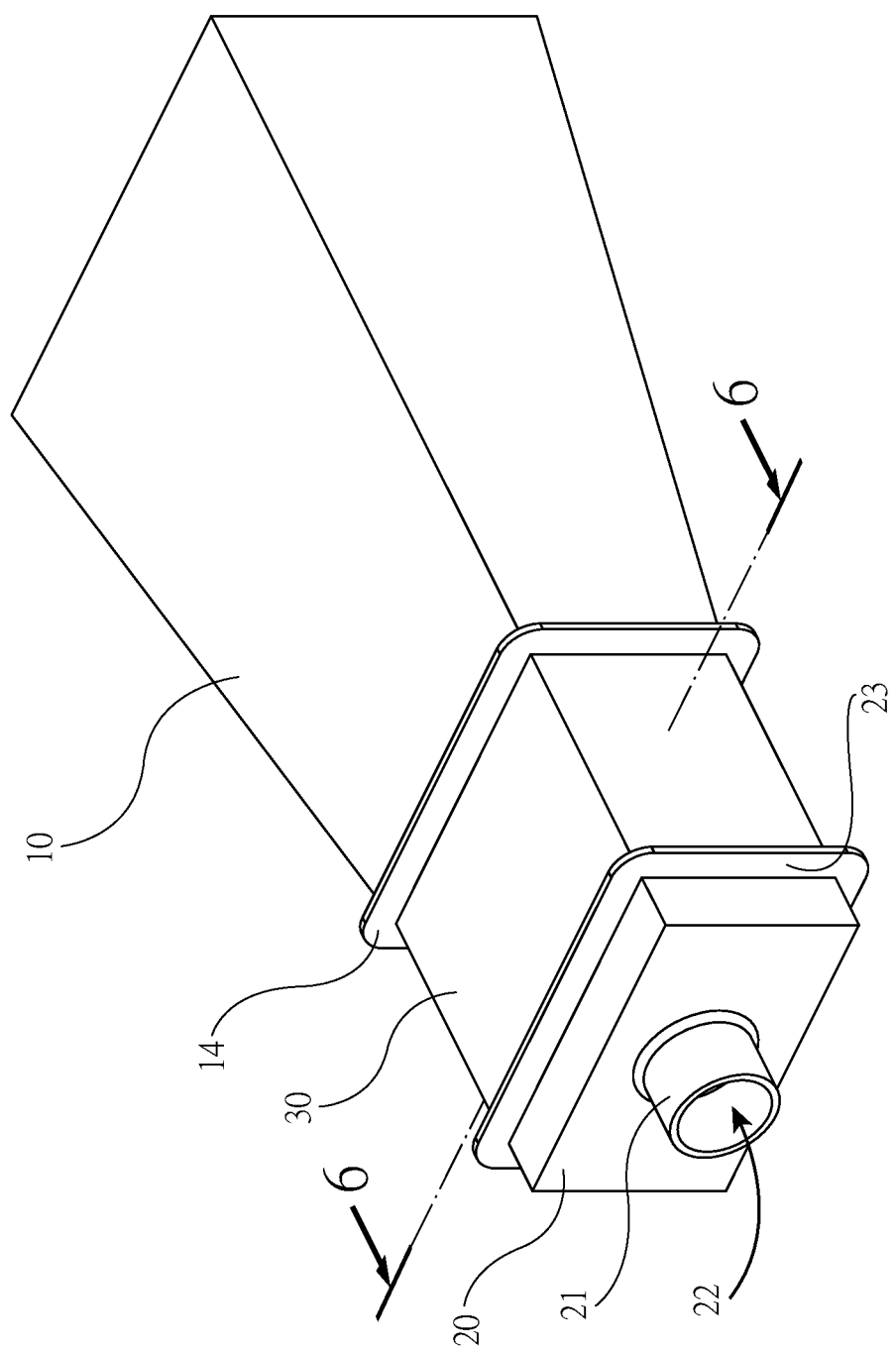
FIG. 3 is a perspective view of a glove collecting device according to a second preferred embodiment of the invention.
Figure 4:
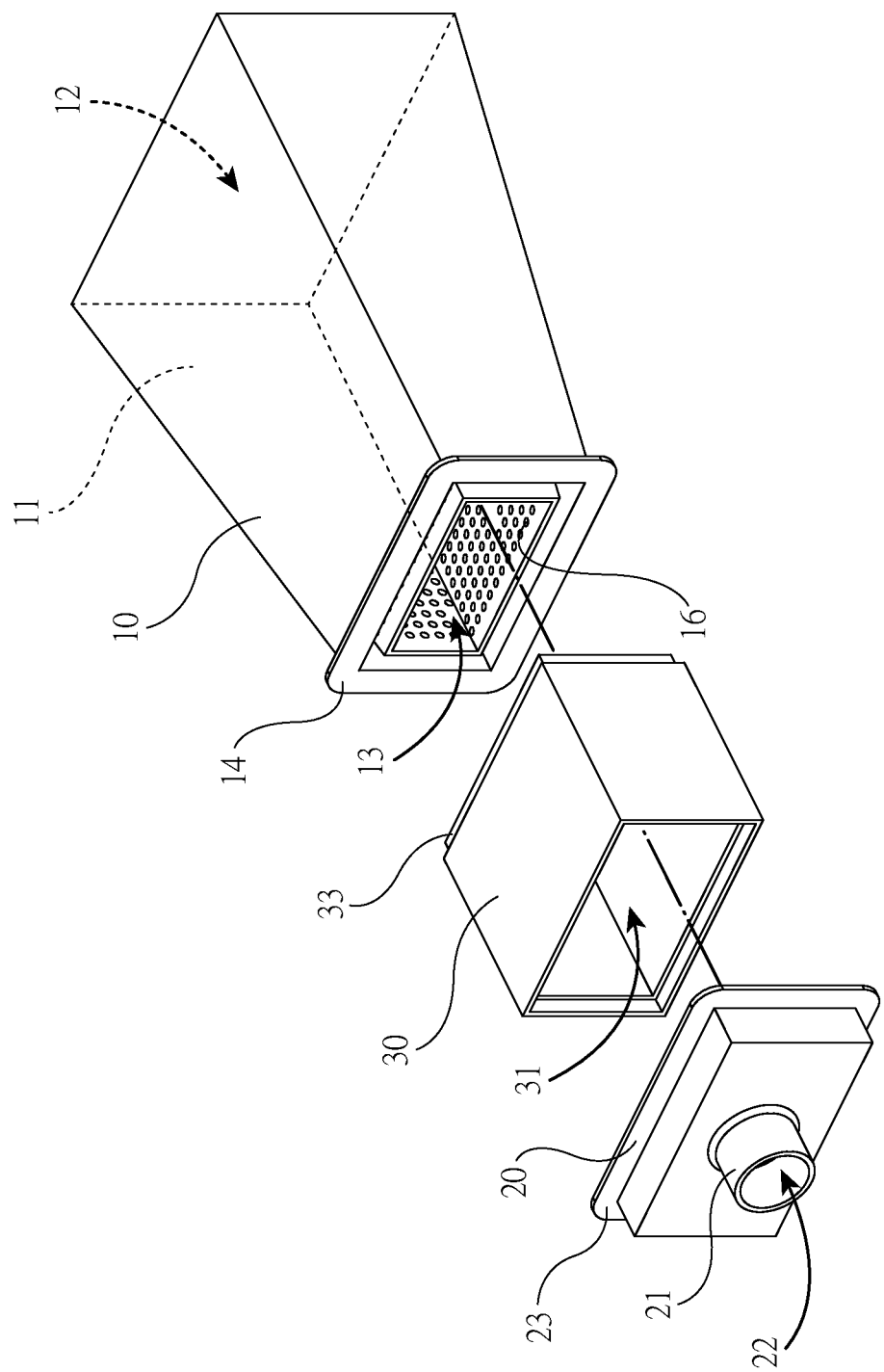
FIG. 4 is an exploded view of FIG. 3.

Referring to FIGS. 3 to 4, a glove collecting device in accordance with a second preferred embodiment of the invention is shown and comprises a guiding member 10, an adaptor member 20 and a connection member 30. The characteristics of the second preferred embodiment are detailed below. The connection member 30 is provided between the guiding member 10 and the adaptor member 20 and includes an internal space 31 having one end communicating with the space 11 and the other end communicating with the channel 22.

Figure 5:
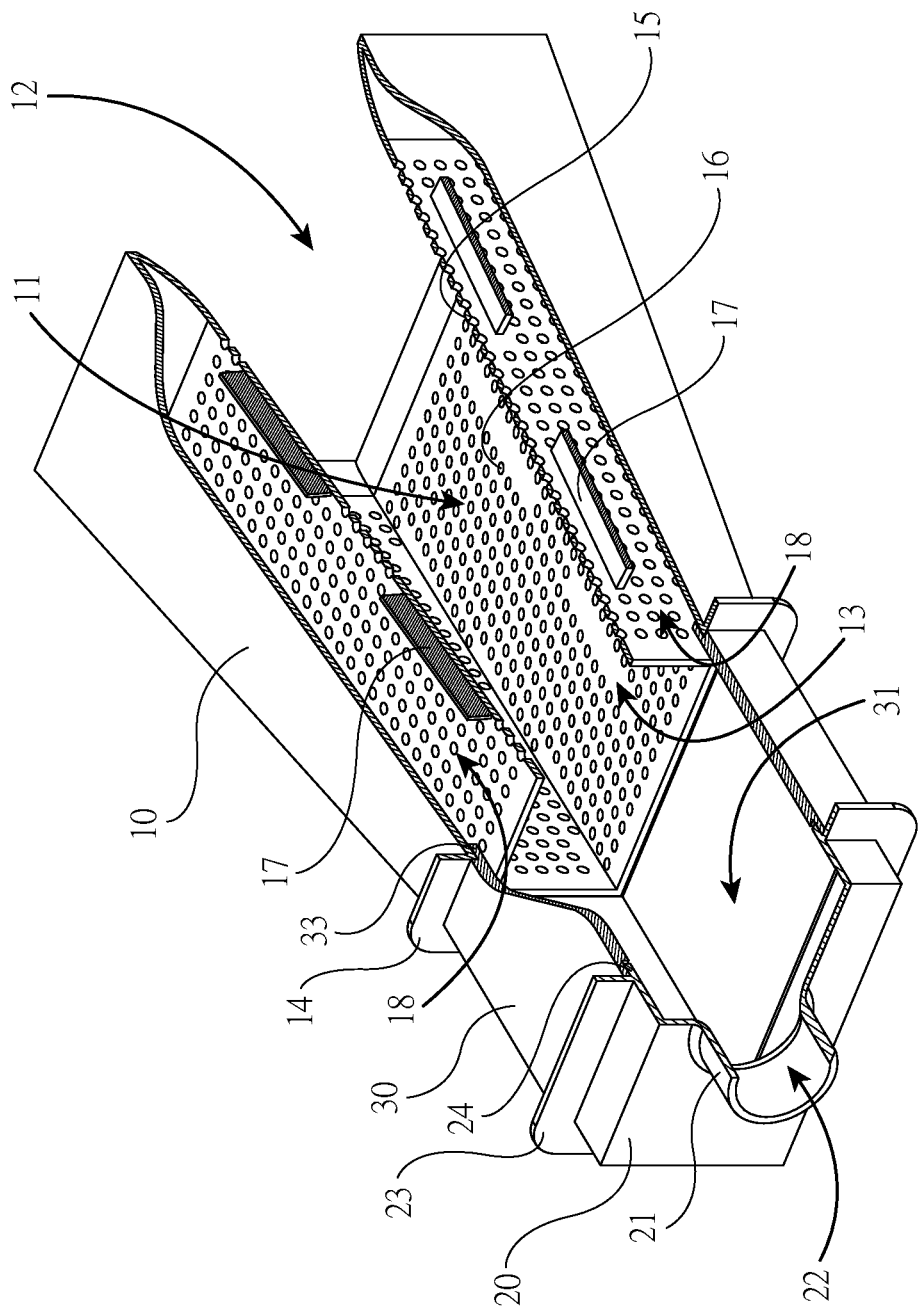
FIG. 5 is a partial cross-sectional perspective view of FIG. 3.

Referring to FIG. 5, the guiding member 10 comprises the outer flange 14 on the outlet 13. The adaptor member 20 further comprises the outer flange 23 distal the connector 21 and a latch 24 perpendicular to the outer flange 23, projecting out of the adaptor member 20, and distal the connector 21. The latch 24 of the adaptor member 20 clamps one end of the connection member 30 to urge the flange 23 of the adaptor member 20 against one end of the connection member 30. The connection member 30 further comprises a latch 33 distal the adaptor member 20 projecting out of the other end of the connection member 30. The latch 33 of the connection member 30 clamps the outlet 13 to urge the flange 14 of the guiding member 10 against the other end of the connection member 30. In addition, the end adjacent to the inlet 12 of the guiding member 10 is bent inwards such that the end adjacent to the inlet 12 extends from the inlet 12 towards the outlet 13 to form an interlayer 15. The interlayer 15 includes a plurality of holes 16. Further, a plurality of intermediate supports 17 are placed away from each other and disposed between an inner surface of the guiding member 10 and the interlayer 15 such that the interlayer 15 and the inner surface of the guiding member 10 form a passage 18. The intermediate supports 17 increase the stability and strengthen the structure of the interlayer 15. The passage 18 provides space for air to flow through.

Figure 6:
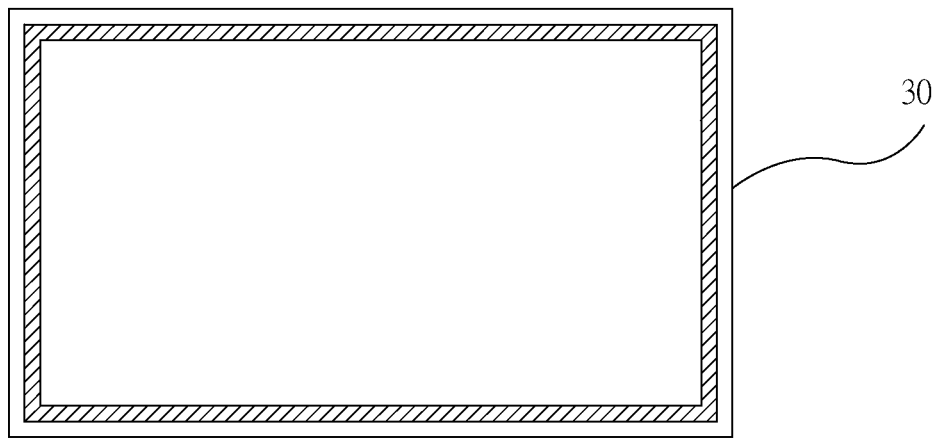
FIG. 6 is a sectional view taken along line 6-6 of FIG. 3 showing a first configuration of an inner surface of a connection member.

Referring to FIG. 6 in conjunction with FIGS. 3, 4 and 5, in a first configuration an inner surface of the connection member 30 is smooth.

Figure 7:
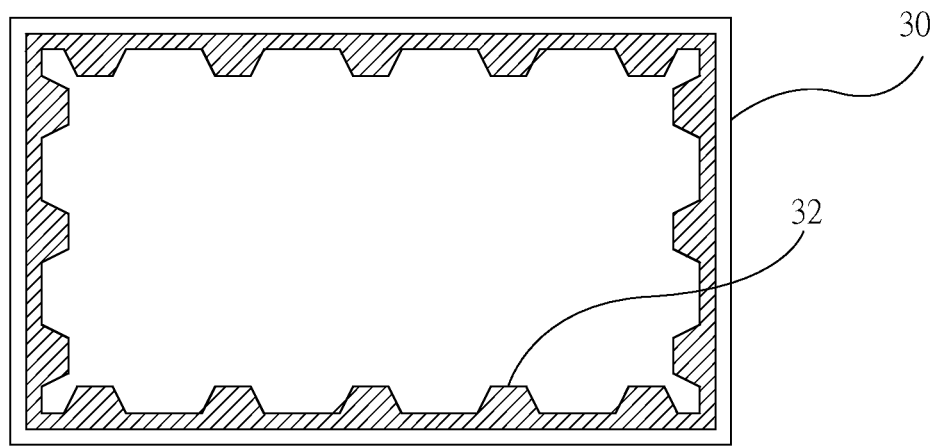
FIG. 7 is a sectional view taken along line 6-6 of FIG. 3 showing a second configuration of the inner surface of the connection member.
Figure 12:
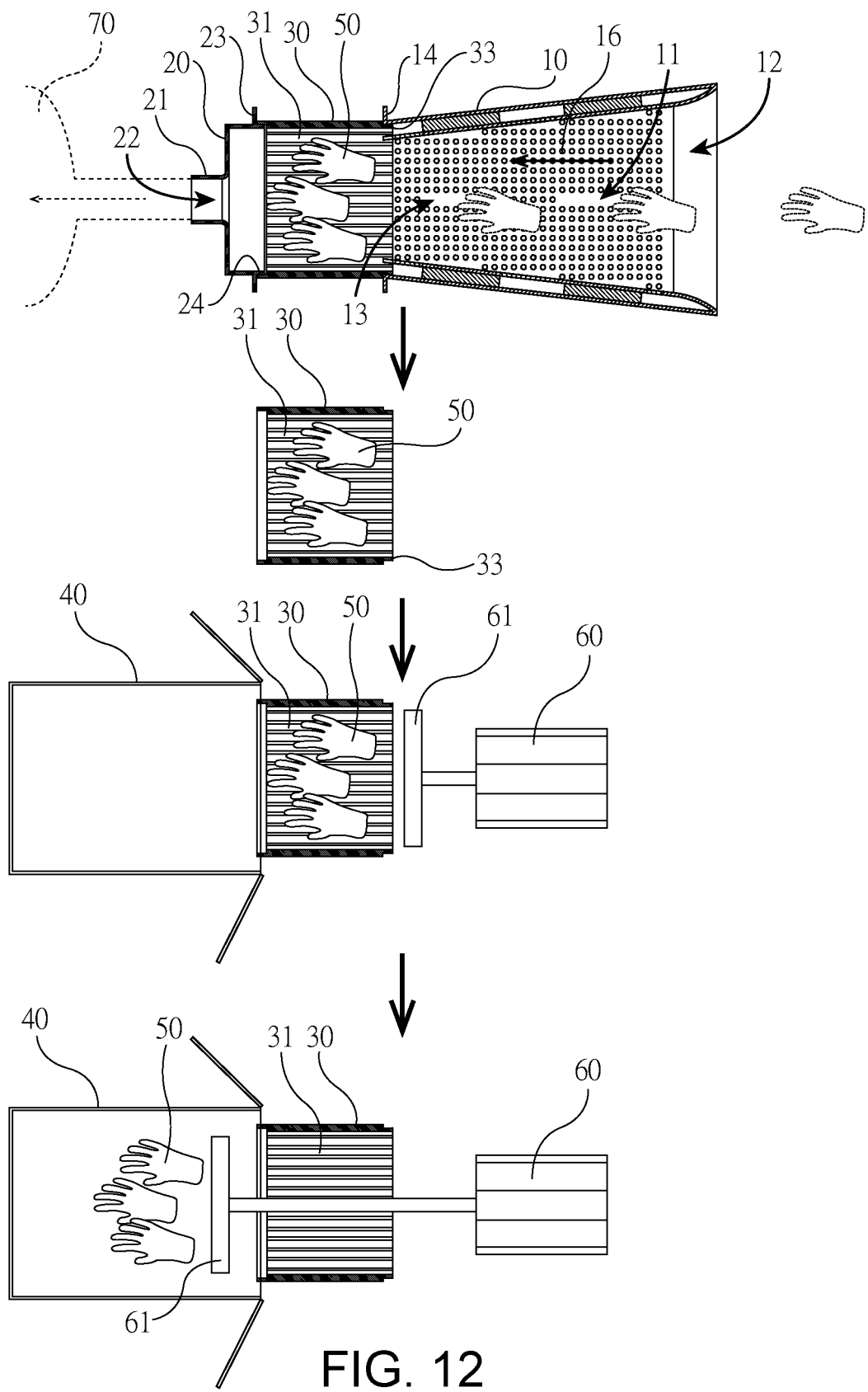
FIG. 12 schematically depicts steps of collecting gloves according to the second preferred embodiment of the invention.

Referring to FIG. 7 in conjunction with FIGS. 3 and 12, in a second configuration the inner surface of the connection member 30 is provided with a plurality of teeth 32 for increasing friction and preventing a plurality of gloves 50 from being adhered to the inner surface of the connection member 30.

Figure 8:
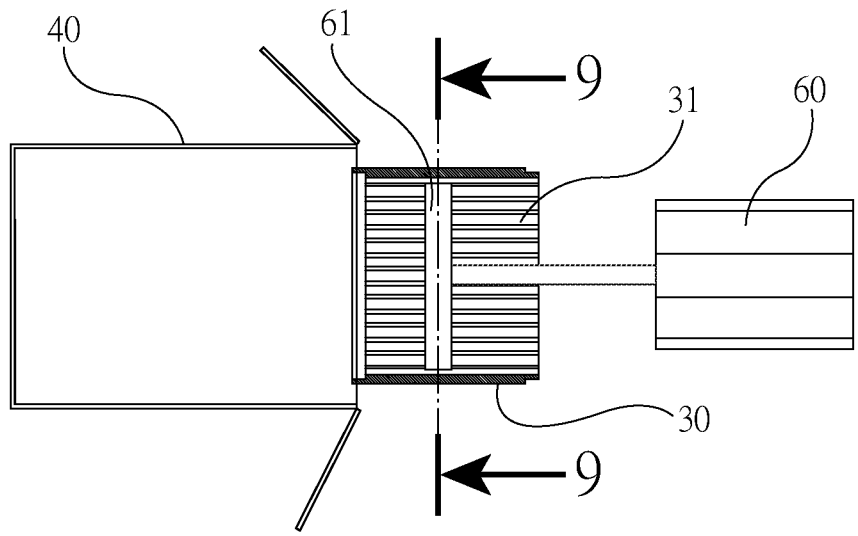
FIG. 8 schematically depicts a movement of a reciprocating board of an activation device in a space of the connection member.
Figure 9:
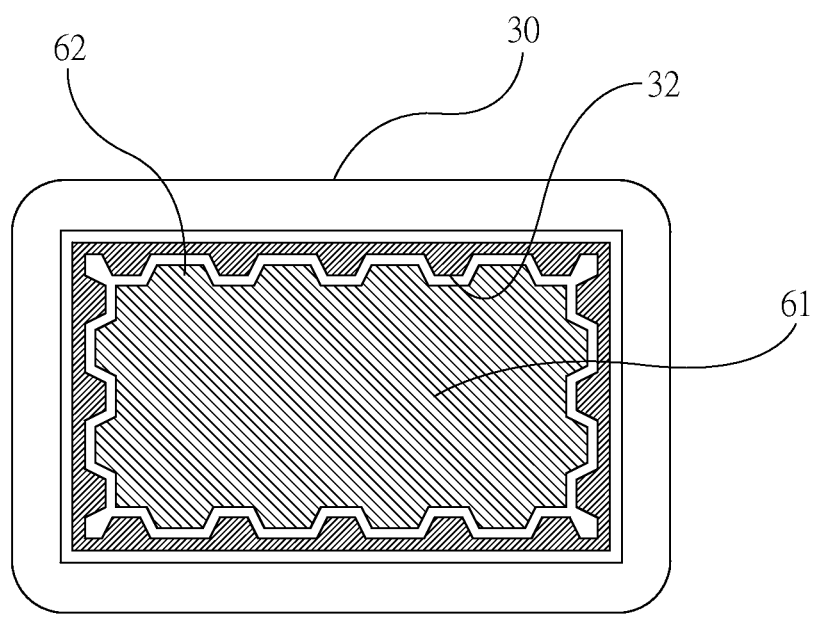
FIG. 9 is a sectional view taken along line 9-9 of FIG. 8 showing an engagement of teeth of the reciprocating board with teeth of the connection member.

Referring to FIGS. 8, 9 and 12, a reciprocating board 61 of an activation device 60 is adapted to move forth and back in the space 31. The teeth 32 are provided on the inner surface of the connection member 30. A plurality of teeth 62 are formed on a periphery of the reciprocating board 61 and mesh with the teeth 32. Thus, the gloves 50 pushed through the connection member 30 by the reciprocating board 61 are not blocked by the teeth 32. Otherwise, the gloves 50 may be damaged.

Figure 10:
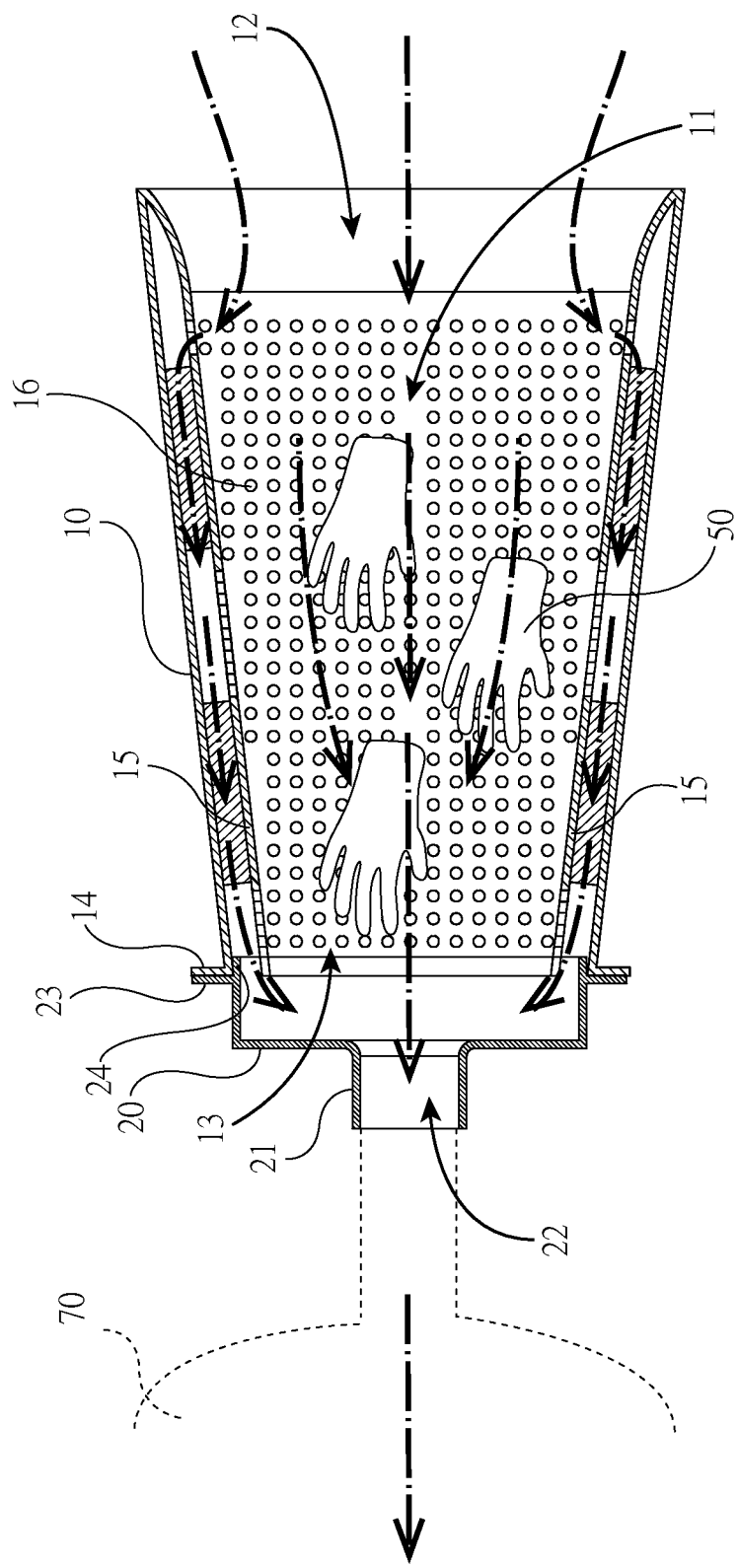
FIG. 10 schematically depicts a current of air generated by an activated blower to draw gloves through the guiding member according to the first preferred embodiment of the invention.

Referring to FIG. 10, the guiding member 10 further comprises the outer flange 14 on the outlet 13. The adaptor member 20 further comprises the outer flange 23 distal the connector 21 and the latch 24 perpendicular to the flange 23, projecting out of the adapter member 20 and distal the connector 21. The latch 24 clamps the outlet 13 to fasten the flange 14 of the guiding member 10 and the flange 23 of the adaptor member 20 together. In addition, an inlet of a blower 70 is connected to the connector 21. After the blower 70 has activated, air is not only drawn from the inlet 12 to the outlet 13 through the space 11, but is also drawn through the holes 16 of the interlayer 15, flowing through spaces between the interlayer 15 and the inner surface of the guiding member 10, and finally to the outlet 13. The air then leaves the outlet 13 and flows through the channel 22 of the adapter member 20 and finally leaving the adapter member 20.

Figure 11:
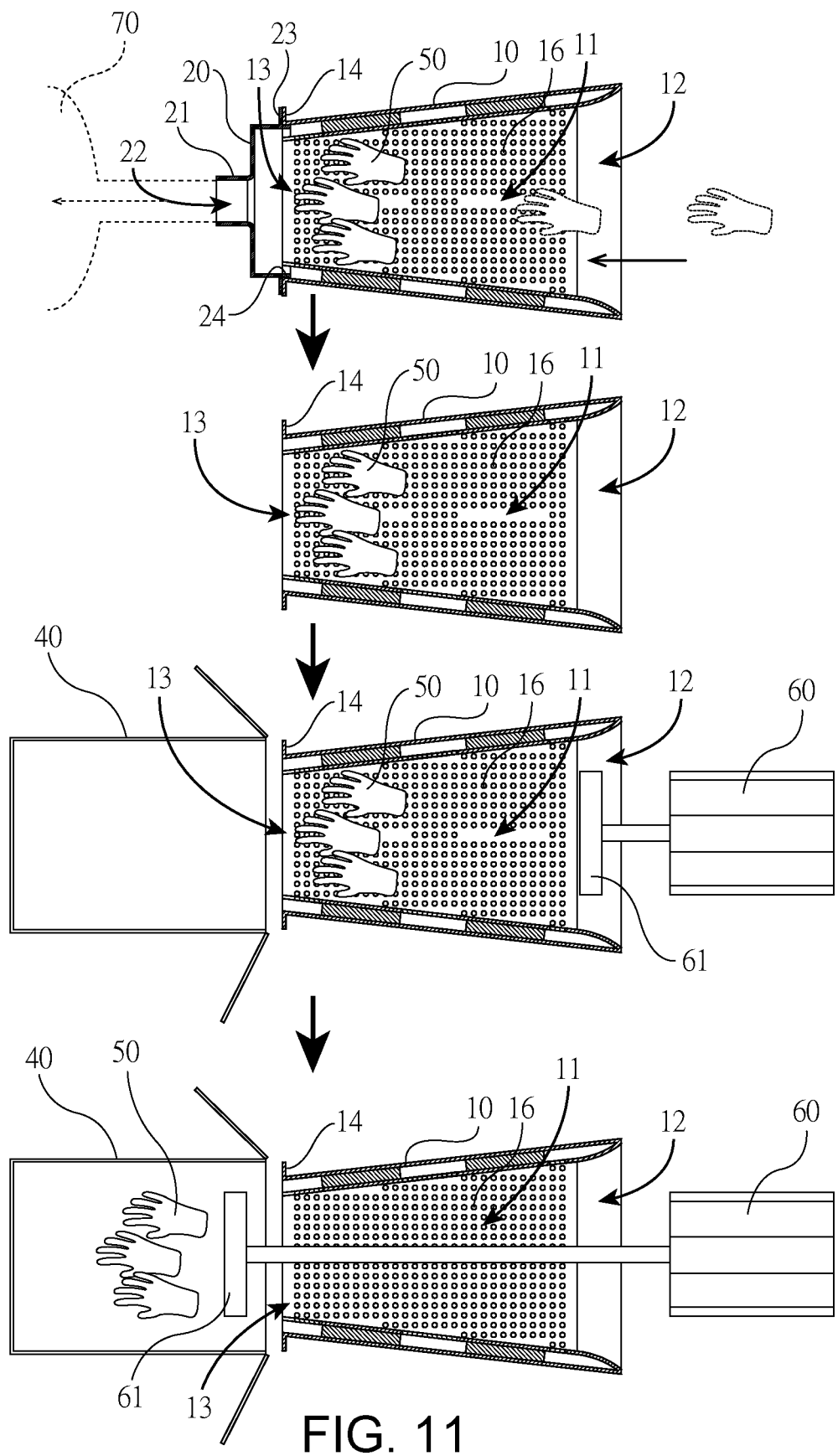
FIG. 11 schematically depicts steps of collecting gloves according to the first preferred embodiment of the invention.

Referring to FIG. 11 in conjunction with FIGS. 2 and 10, as shown, size of the inlet 12 is greater than that of the outlet 13 and the blower 70 is connected to the connector 21. Suction force is generated in the blower 70 when the blower 70 is activated. Thus, the gloves 50 are drawn into the space 11 through the inlet 12. The adaptor member 20 is removed after the number of the gloves 50 accumulated in the space 11 has reached a predetermined value. Next, the activation device 60 is activated to push the gloves 50 into a collection box 40 through the outlet 13. It is envisaged by the invention that the collection of the gloves 50 is automated, safe, labor saving and efficient. The holes 16 disposed on the interlayer 15 increase the suction force, and accelerate the collection of the gloves 50. As a whole, the collection of the gloves 50 is more efficient.

Referring to FIG. 12 in conjunction with FIGS. 4 and 5, the connection member 30 is provided to interconnect the guiding member 10 and the adaptor member 20 and the blower 70 is connected to the connector 21. Suction force is generated in the blower 70 when the blower 70 is activated. Thus, the gloves 50 are drawn into the space 11 through the inlet 12. And in turn, the gloves 50 move from the space 11 to the connection member 30 and stack therein. After the number of the gloves 50 accumulated in the connection member 30 has reached a predetermined value, the gloves 50, both the adaptor member 20 at one end of the connection member 30 and the guiding member 10 at the other end thereof are removed and the connection member 30 is aligned with the collection box 40. Next, the activation device 60 is activated to push the gloves 50 in the connection member 30 into the collection box 40. It is envisaged by the invention that the collection of the gloves 50 is automated, safe, labor saving and efficient. Further, the holes 16 disposed on the interlayer 15 increase the suction force, and accelerate the collection of the gloves 50. As a whole, the collection of the gloves 50 is even more efficient.

The provision of the connection member 30 has the following advantages: While the connection member 30 moves the gloves 50 into the collection box 40, another connection member 30 can be attached to the guiding member 10 to allow the gloves 50 to pass through. This increases the glove collection efficiency and saves the glove collection time.

While the invention has been described in terms of preferred embodiments, those skilled in the art will recognize that the invention can be practiced with modifications within the spirit and scope of the appended claims.

What is claimed is:

1. A glove collecting device, comprising:
   a guiding member including an internal space, an inlet at one end, and an outlet at another end, wherein the end adjacent to the inlet of the guiding member is bent inwards such that the end adjacent to the inlet extends from the inlet towards the outlet to form an interlayer and the interlayer includes a plurality of holes, and wherein the guiding member further comprises an outer flange on the outlet; and
   an adaptor member disposed externally of the outlet and including a hollow connector distal the outlet, and a channel through the connector for communicating with the space of the guiding member.

2. The glove collecting device of claim 1, wherein the adaptor member further comprises an outer flange distal the connector and a latch perpendicular to the flange and distal the connector; and wherein the latch clamps the outlet to fasten the flange of the guiding member and the flange of the adaptor member together.

3. The glove collecting device of claim 2, wherein the space of the guiding member is tapered from the inlet thereof to the outlet thereof.

4. The glove collecting device of claim 1, further comprising a connection member between the guiding member and the adaptor member, the connection member including an internal space having one end communicating with the space of the guiding member and the other end communicating with the channel.

5. A glove collecting device comprising:
   a guiding member including an internal space, an inlet at one end, and an outlet at another end, wherein the end adjacent to the inlet of the guiding member is bent inwards such that the end adjacent to the inlet extends from the inlet towards the outlet to form an interlayer and the interlayer includes a plurality of holes; and
   an adaptor member disposed externally of the outlet and including a hollow connector distal the outlet, and a channel through the connector for communicating with the space of the guiding member;
   a connection member between the guiding member and the adaptor member, the connection member including an internal space having one end communicating with the space of the guiding member and the other end communicating with the channel,
   wherein the guiding member further comprises an outer flange on the outlet, wherein the adaptor member further comprises an outer flange distal the connector and a latch perpendicular to the flange and distal the connector, wherein the latch of the adaptor member clamps one end of the connection member to urge the flange of the adaptor member against one end of the connection member, wherein the connection member further comprises a latch distal the adaptor member projecting out of the other end of the connection member, and wherein the latch of the connection member clamps the outlet to urge the flange of the guiding member against the other end of the connection member.

6. The glove collecting device of claim 5, further comprising a plurality of intermediate supports placed away from each other and disposed between an inner surface of the guiding member and the interlayer such that the interlayer and the inner surface of the guiding member form a passage.

7. The glove collecting device of claim 6, further comprising an activation device including a reciprocating board configured to move forth and back in the space of the connection member; wherein the connection member further comprises a plurality of teeth on an inner surface; wherein the reciprocating board includes a plurality of teeth on a periphery; and wherein the teeth of the connection member mesh with the teeth of the reciprocating board.

8. The glove collecting device of claim 7, wherein the space of the guiding member is tapered from the inlet thereof to the outlet thereof.

9. The glove collecting device of claim 6, wherein an inner surface of the connection member is smooth.

* * * * *